(12) United States Patent
Jensen et al.

(10) Patent No.: US 7,360,935 B2
(45) Date of Patent: Apr. 22, 2008

(54) IMITATION CANDLE WITH SIMULATED LIGHTED WICK

(75) Inventors: Bradford B. Jensen, Saint Joseph, MI (US); Roger D. Bentley, Coloma, MI (US); Kim I. McCavit, Saint Joseph, MI (US)

(73) Assignee: Winvic Sales, Inc., Markham (CA)

( * ) Notice: Subject to any disclaimer, the term of this patent is extended or adjusted under 35 U.S.C. 154(b) by 223 days.

(21) Appl. No.: 11/053,397

(22) Filed: Mar. 31, 2005

(65) Prior Publication Data

US 2008/0074875 A1    Mar. 27, 2008

(51) Int. Cl.
*F21V 35/00*    (2006.01)

(52) U.S. Cl. .................. 362/555; 362/569; 362/392; 362/810

(58) Field of Classification Search .............. 362/392, 362/551, 555, 565, 569, 810; 431/289, 253
See application file for complete search history.

(56) References Cited

U.S. PATENT DOCUMENTS

| | | | |
|---|---|---|---|
| 1,351,562 A * | 8/1920 | Foster | 362/569 |
| 2,080,259 A * | 5/1937 | Frei, Jr. | 362/569 |
| 2,435,811 A * | 2/1948 | Waters | 362/569 |
| 3,749,904 A | 7/1973 | Graff | |
| 6,074,199 A * | 6/2000 | Song | 431/253 |
| 6,616,308 B2 | 9/2003 | Jensen et al. | |
| 7,098,600 B2 * | 8/2006 | Li et al. | 315/149 |
| 7,121,686 B1 * | 10/2006 | Chu | 362/234 |
| 2002/0093734 A1 * | 7/2002 | Yu et al. | 362/565 |
| 2002/0110319 A1 | 8/2002 | Chung | |
| 2003/0035291 A1 | 2/2003 | Jensen et al. | |
| 2004/0246744 A1 | 12/2004 | Krupa et al. | |
| 2005/0180148 A1 * | 8/2005 | Ham et al. | 362/447 |
| 2005/0239009 A1 * | 10/2005 | Holmburg | 431/253 |
| 2006/0046220 A1 * | 3/2006 | Lin | 431/253 |

FOREIGN PATENT DOCUMENTS

GB    2380539 A    4/2003

* cited by examiner

*Primary Examiner*—Thomas M. Sember
(74) *Attorney, Agent, or Firm*—O'Malley and Firestone

(57) ABSTRACT

A decorative, imitation candle includes a simulated wick which generates the appearance of an open flame in a darkened environment. A light pipe is located at the expected location of the wick. The exposed end of the light pipe has a tip which produces a point like a light source with a glare effect to darkness accommodated eyes when the device is illuminated. The glare is interpreted as an open flame without the need for a flame shaped terminating structure which is visible when the imitation candle is unlit.

3 Claims, 6 Drawing Sheets

IMITATION CANDLE WITH SIMULATED LIGHTED WICK

BACKGROUND OF THE INVENTION

1. Technical Field

The invention relates to decorative, imitation candles and, more particularly, to an imitation candle simulating a lighted wick.

2. Description of the Problem

Numerous manufacturers have attempted to meet a demand for a flameless, candle like luminary using electrical illumination. There are many imitation candles available that use incandescent lamps or LED's as a light source. These devices address people's concern with having an open flame indoors. Most of these devices try to implement the appearance of a realistic flame using a specially shaped bulb or lens that is exposed to view. Typically, the bulb or lens sits on top of a thin cylindrical sleeve, which is shaped and colored to resemble a candle. The results are typically disappointing, especially when these devices are not illuminated. The visible, flame shaped artificial light source makes the imitation candle as a whole appear artificial. The result can look more like a caricature of a candle than a real candle. The color of incandescent light can leave something to be desired in many candles as well.

U.S. Pat. No. 6,616,308 teaches an imitation candle configured to diminish any expectation on the part of an observer of seeing an open flame. U.S. Pat. No. 6,616,308 is incorporated herein by reference. Visually, the key visual element of a real flame is a rather intense spot of light, which when viewed directly, could be bright enough in a dark environment to be a source of glare. In a dark environment, for example, when the human eye is adjusted for scotopic vision, the eye cannot tolerate the large contrasts in brightness and as a result the physical outline of the flame is often lost to the eye. In the case of artificial flame structures, often the outer surface is frosted, or the body has some pigmentation so that the flame structure is itself lit up. By spreading the light from the internal light source across a larger surface area, the intensity of light at the surface is much less than the driving source. Because of this lack of point source intensity, the brain does not interpret the flame structure as a real flame. Incandescent lamps that have clear glass flame structures reveal an intense filament, but the filaments are linear, so these only appear as point sources when viewed from some distance.

One approach to creating a realistic illusion of a flame is disclosed in U.S. patent application Ser. No. 10/844,075, filed 12 May 2004, which is incorporated herein by reference. This application discloses an LED hidden within a fixture above an imitation candle body. Light emitted by the LED is directed to illuminate the candle body and wick from above. The LED is driven by a variable current to produce flickering light. The imitation wick has a reflective tip which reflects the incident light to create a small bright spot. The bright spot at the tip of the wick is sufficiently bright that even though the light source may be flickering, the intensity remains strong enough that the eye cannot see the change in intensity of the spot. At the same time, light shines past the wick and onto the candle body where it is diffused throughout a relatively large volume. The light intensities within the candle body are much lower resulting in a dramatic, flickering effect.

For standalone imitation candles that are not housed in a permanent fixture, the approach of the '075 application is more difficult to effect since there is no convenient place to hide the LED but within the candle body itself. If the effect of a lighted wick is to be reproduced it would be advantageous to produce a similar effect with a light source internal to the imitation candle.

Imitation candles that use incandescent lamps located at the tip of the candle do not produce a bright spot with the same effect as desired, at least at close distances, because the coil used in the bulb is not a true point source. The coil instead appears as a horizontal line source. Decorative applications of fiber optics have used fiber optic rods to transmit light from a central light source to a variety of emission points. Because the lighted fiber ends are small, they create a lighting effect that looks like lighted 'hairs', which cannot be produced by traditional light sources.

Another use of fiber optics has been as panel indicator light pipes. These have been designed and used in many forms to transmit light. No attempt, known to the present inventors, has been made to simulate illumination of an imitation wick. These have as their design objective to transmit as much light as possible from the light source into the light pipe.

SUMMARY OF THE INVENTION

According to the invention there is provided an imitation candle having a translucent body with an upper surface. A light source is located within the translucent body under the upper surface for illuminating the upper portion of the translucent body. A light pipe pierces the upper surface near its center. The light pipe has a buried portion beneath the upper surface and an exposed portion above the upper surface. The exposed portion terminates in a light diffusing tip end and the buried portion terminates sufficiently proximate to the light source to capture an effective quanta of light emitting from the light source for illuminating the light diffusing tip end at a desired intensity. Most of the rest of the exposed portion of the light pipe is modified to appear to be a burnt wick.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
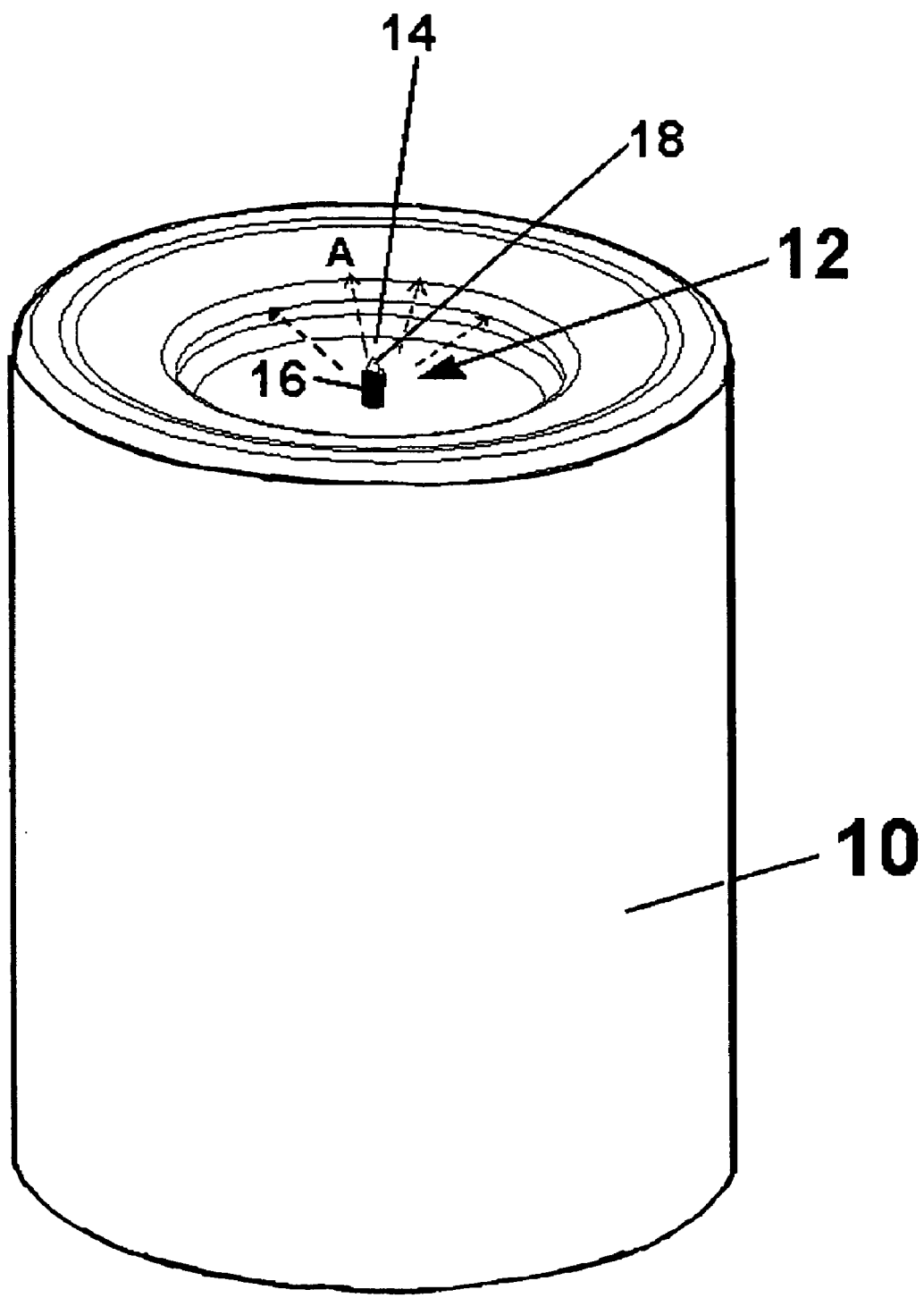
FIG. 1 is a perspective view of an imitation candle.

Referring to FIG. 1 an exterior configuration for several possible embodiments of the invention is illustrated in perspective view. Imitation candle body 10 is a squat element, configured to resemble a self supporting candle which has burned down by the center. Imitation candle body 10, which can be fabricated in wax or translucent plastic, contains an internal light source positioned within the imitation candle body so as to illuminate the candle body with a diffuse, flickering glow that simulates the appearance of a lit candle. A light pipe 12 extends upwardly from a central depressed section 14 in the upper surface 19 of imitation candle body 10. As described below, a buried end of a light pipe 12 is positioned in sufficiently close proximity to the internal light source to capture a portion of the light emitted by the light source sufficient to generate a bright point source of light at an exposed tip end 18 at the opposite end of the light pipe. This opposite, exposed end of the light pipe 12 extends from candle body 10 at a location where a candle wick would normally be positioned. The extreme tip end 18 of light pipe 12 is roughened or faceted to diffuse the captured light and create the visible bright point source of light. A dark colored sleeve 16 extends from tip end 18 at least to the depressed surface 14 and covers the all but the tip end 18 of the exposed portion of light pipe 12 to simulate the look of a real, previously burned wick. Emission of light from the internal light source is indicated at letter "A" by phantom lines.

Figure 2:
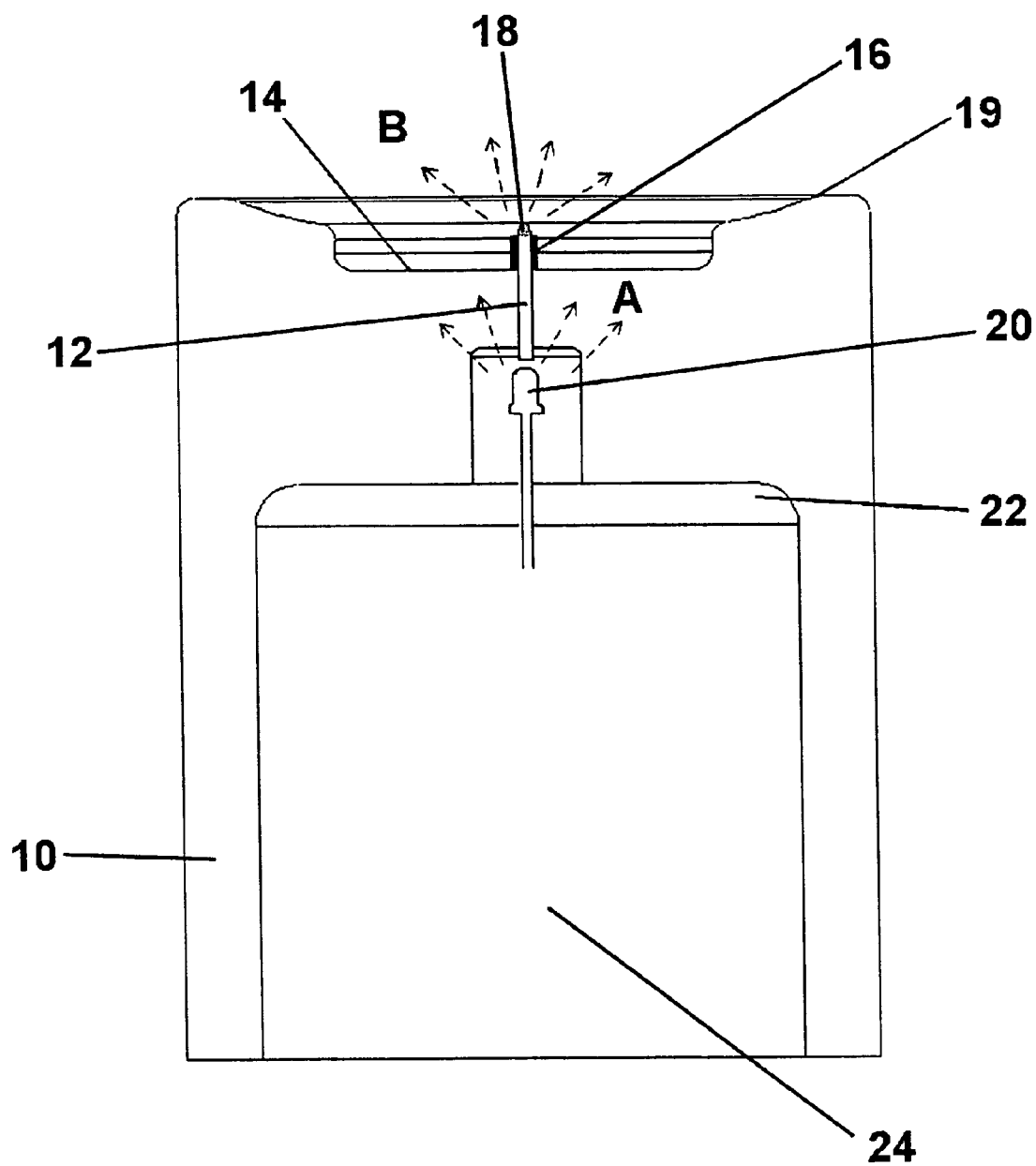
FIG. 2 is a cross sectional view of a possible internal configuration for the imitation candle of FIG. 1.

FIG. 2 shows a cross-sectional view of the imitation candle body 10 shown in FIG. 1 illustrating a possible internal configuration thereof. A cavity 24 within the lower portion of imitation candle body 10 allows space for the installation of an electronics module (not shown) that provides the power source, switch and circuitry needed to drive the internal light source 20. Internal light source 20 is preferably a super bright light emitting diode (LED) as described in U.S. Pat. No. 6,616,308 but could be an incandescent source. In addition to supplying current to the light source 20, such an electronics module may include on/off timers, daylight sensors and a flicker energization circuit to cause the light source 20 to flicker after the fashion on an unstable candle flame. Light pipe 12 is disposed with one end located near to and open with respect to light source 20. When light source 20 is illuminated light pipe 12 captures a small portion of the light emitted thereby. Light pipe 12 is preferably constructed using a single fiber optic cable with a diameter similar to a candle wick. Alternatively light pipe 12 could be a small bundle of smaller fiber optic filaments. The light captured by light pipe 12 from light source 20 is directed to the opposite end of the light pipe where it strikes a light diffusing tip 18. Light diffusing tip 18 may be created by roughening or faceting the end of the light pipe so that it scatters light in all directions creating a point source of bright light. Still other alternate schemes may also be used to diffuse the light when it reaches the exposed end of the light pipe 12. Dark colored, opaque sleeve 16 surrounds the expose portion of light pipe 12 excluding the light diffusing tip end 18 and serves to disguise the light pipe 12 and give it the appearance of a real wick which has burned down. Alternatives to the sleeve 16 could be used to disguise the light pipe 12 as a wick, but care must be taken not to interfere with the light transmitting properties of the light pipe 12. An opaque barrier 22 is disposed over cavity 24 and under light source 20. Opaque barrier 22 controls illumination levels from top to bottom of the imitation candle body 10, limiting light emission to the upper portion of the body.

Figure 3:
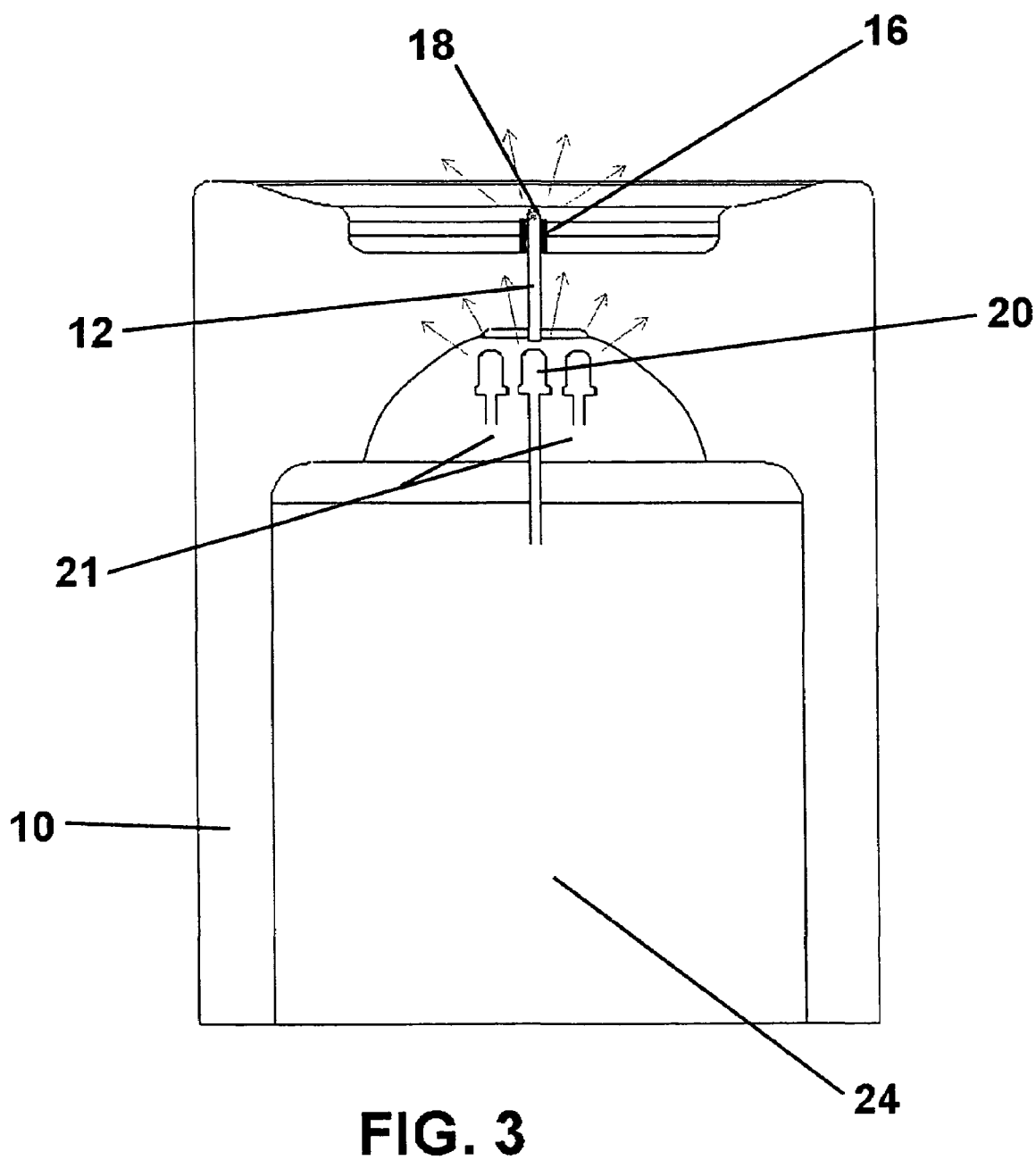
FIG. 3 is a cross sectional view of an alternative internal configuration in accordance with a second embodiment of the imitation candle of FIG. 1.

FIG. 3 shows an alternative embodiment for the internal configuration of imitation candle body 10. An array of LED's 21 are disposed around light source (LED) 20 within imitation candle body 10. The primary role of the additional LED's 21 is to more fully illuminate imitation candle body 10 thus allowing more of the light from main light source 20 to be captured by the light pipe 12 increasing the intensity of light emitted at the light diffusing tip end 18.

Figure 4:
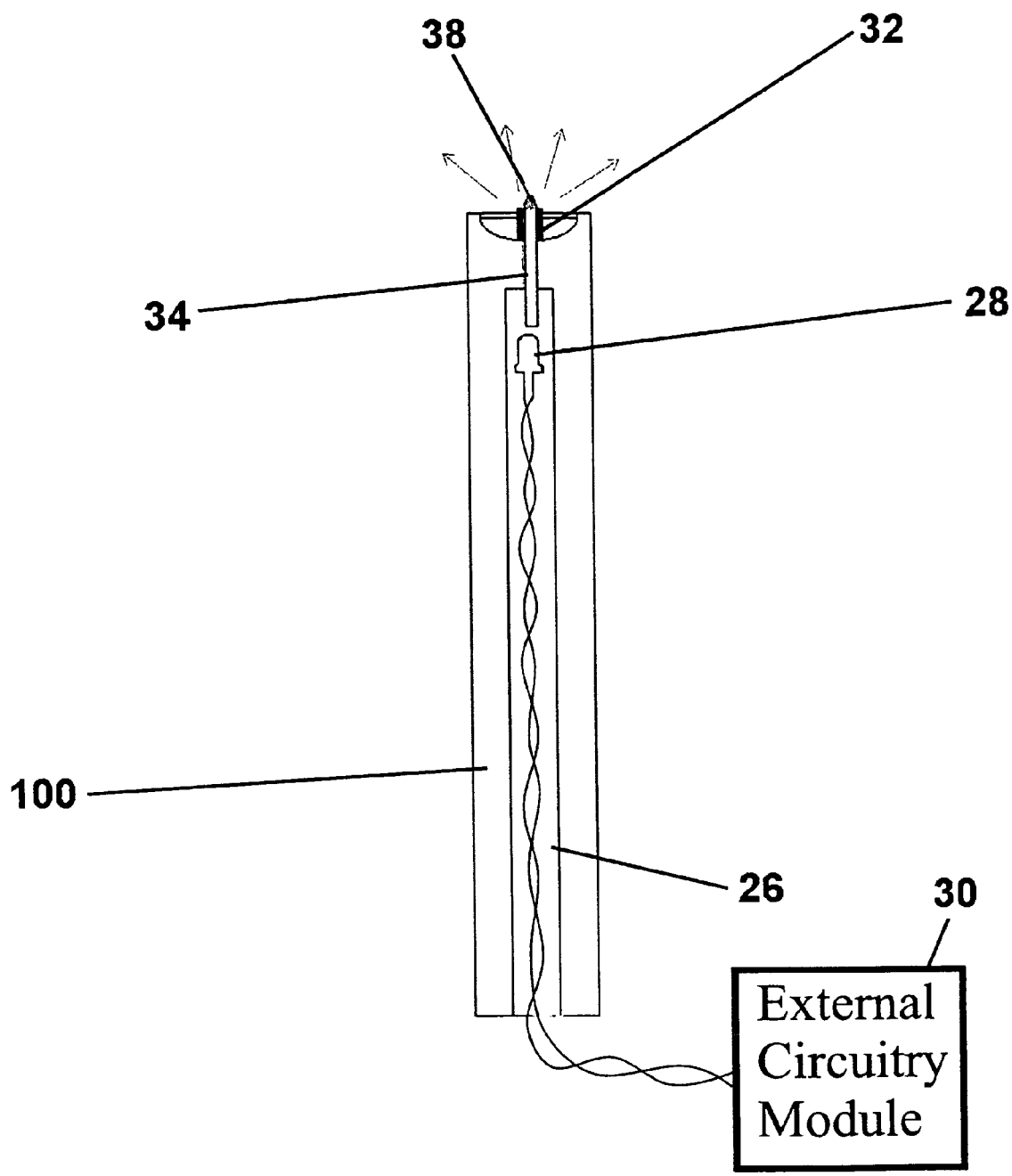
FIG. 4 is a cross sectional view of still another embodiment of the invention.

FIG. 4 shows an embodiment of the invention in a taper style candle body 100. Taper style candle body 100 has a small channel 26 running nearly the length of the body from near its top out through the bottom of the body is used to allow connection of the light source 28 to an external circuit 30. External circuit 30 would typically be hidden in a candle pedestal. Alternatively the electronics could be miniaturized to fit in the imitation candle body at some expense. The upper end of taper style candle body 100 is closed and forms a depressed surface 32 with a fiber optic light pipe 34 passing through the depressed surface from a lower end adjacent light source 28 to an exposed tip end 38. Again, most of the exposed portion of light pipe 34 is enclosed in a darkened, opaque sleeve 36, except for the light diffusing tip end 38.

Figure 5:
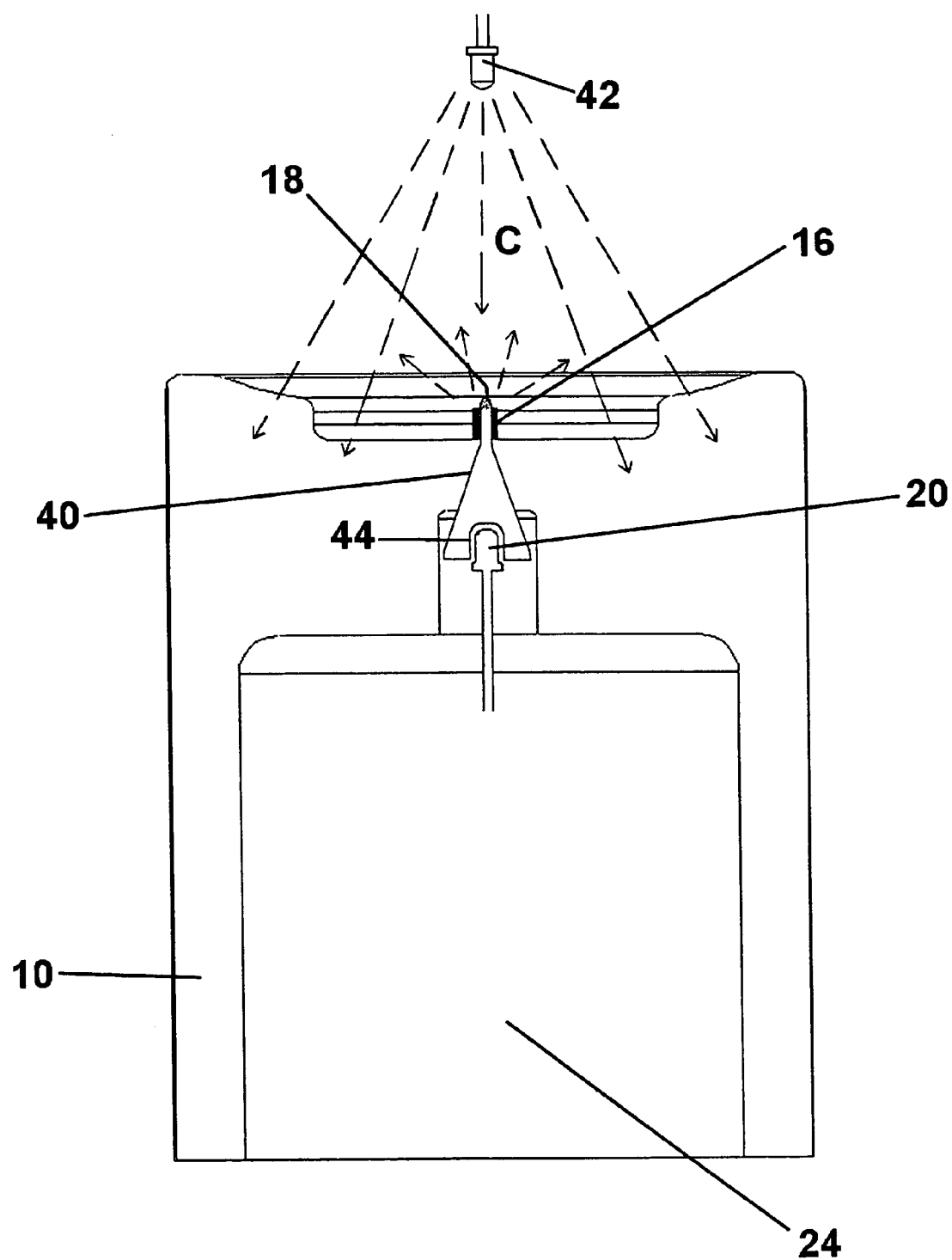
FIG. 5 is a cross section of an imitation candle in accordance with the invention having enhanced light coupling from an LED light source to a fiber optic imitation wick.

FIG. 5 shows an alternative embodiment of the invention wherein the light pipe 40 is designed to capture a large portion of the light emanating from the light source 20. The end of light pipe 40 adjacent light source is bulbous, and extends around the light source forming a cylindrical receptacle 44 in which LED 20 is disposed. An external LED 42, located above the imitation candle body 10 and typically hidden within a fixture that contains the candle, is used to illuminate the imitation candle body from above.

Figure 6A:
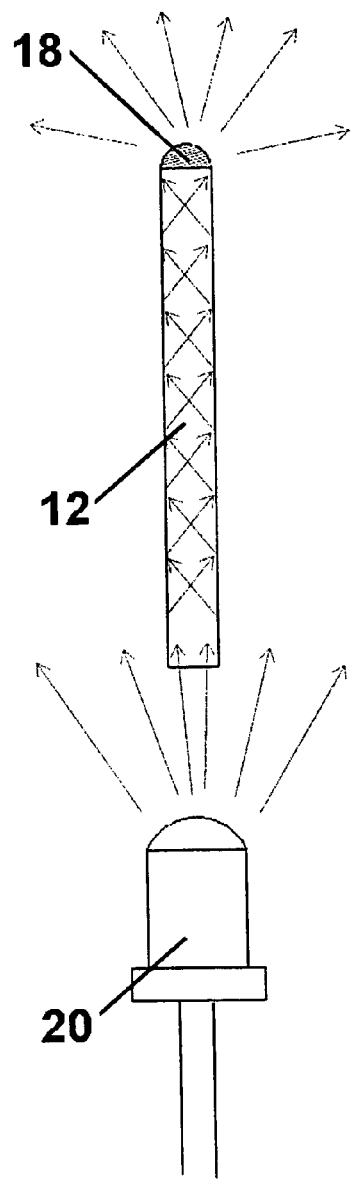
FIGS. 6A-C are variations on configurations of the imitation wick.
Figure 6B:
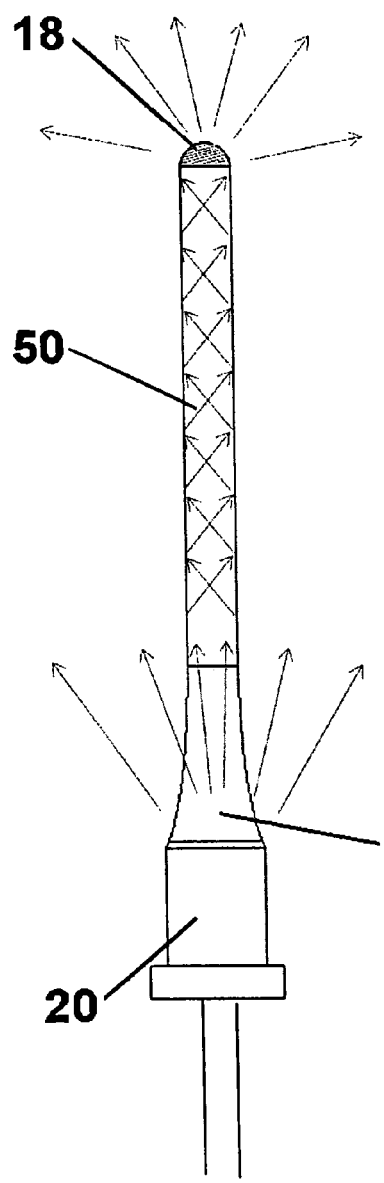
Figure 6C:
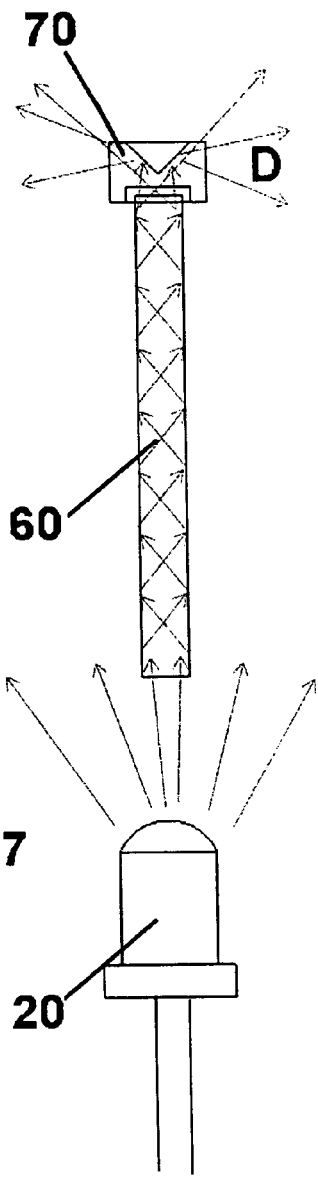

FIGS. 6A-C shows detailed views of three possible implementations of the light source 20 and various light pipes. FIG. 6A shows a simple light pipe 12 one end of which has been scratched and roughened to form a light diffusing tip 18. A portion of the light emanating from the light source 20 is captured by the light pipe 12 and directed to the light diffusing tip 18 where it is scattered to form a bright point source of light. FIG. 6B shows a light pipe 50 which has been molded as an integral part of the epoxy body 27 that encapsulates the LED 20. FIG. 6C shows an alternate construction that using a light pipe 60 that is polished on both ends and uses a separate diffuser 70 to redirect the light coming from the exposed end 80 of the light pipe 60. In all three light pipes 12, 50 and 60 light is illustrated as being transmitted through the pipes, being reflected inwardly by the surface of the pipe until encountering an irregular, light diffusing, terminating end. The letter D illustrates scattering of the light. The light pipe is disposed to capture sufficient light from the light source to create a glare effect to darkness accommodated eyes from the light diffusing tip 18.

The invention provides an imitation candle giving a realistic illusion of supporting an exposed flame while retaining flickering, illuminated body.

While the invention is shown in only one of its forms, it is not thus limited but is susceptible to various changes and modifications without departing from the spirit and scope of the invention.

What is claimed is:
1. An imitation candle comprising:
 a translucent body shaped to resemble a candle body which has an upper surface;
 a light pipe disposed on the translucent body to extend through the upper surface, the light pipe having a buried portion extending into the translucent body beneath the upper surface and an exposed portion extending above the upper surface, the exposed portion of the light pipe having a diameter closely matched to a candle wick and terminating in a light diffusing tip end which scatters light emitted therefrom;
 an opaque sleeve enclosing the exposed portion of the light pipe excluding the light diffusing tip so that the exposed portion resembles a candle wick; and
 a light source located within the translucent body to visibly illuminate a portion of the translucent body directly beneath the exposed portion when lit and in proximity to the light pipe for coupling of light from the light source to the light pipe for emission from the diffusing tip.

2. An imitation candle as claimed in claim 1, the light pipe being a fiber optic rod.

3. An imitation candle as claimed in claim 1, further comprising: the upper surface including a central depression in which the exposed portion is centered to resemble a wick in a partially burned downed upper surface of a candle.

* * * * *